(12) United States Patent
Ko et al.

(10) Patent No.: US 7,555,128 B2
(45) Date of Patent: Jun. 30, 2009

(54) SYSTEMS AND METHODS FOR THE APPLICATION OF CRYPTOSYSTEMS TO THE DATA LINK LAYER OF PACKETIZED WIRELESS NETWORKS

(75) Inventors: Nam Kon Ko, West Caldwell, NJ (US); Kwang-Bock You, Pine Brook, NJ (US); Jung Gil Shin, Glen Rock, NJ (US)

(73) Assignee: nDosa Technologies, Inc., Fairfield, NJ (US)

( * ) Notice: Subject to any disclaimer, the term of this patent is extended or adjusted under 35 U.S.C. 154(b) by 840 days.

(21) Appl. No.: 10/980,757

(22) Filed: Nov. 3, 2004

(65) Prior Publication Data

US 2006/0093148 A1  May 4, 2006

(51) Int. Cl.
*H04K 1/00* (2006.01)
(52) U.S. Cl. ..................... 380/270
(58) Field of Classification Search ................ 380/270; 713/151, 160, 260
See application file for complete search history.

(56) References Cited

U.S. PATENT DOCUMENTS 7,269,260 B2 *  9/2007  Adachi et al. ............... 380/270
7,277,548 B2 * 10/2007  Park et al. ................... 380/270
2004/0053601 A1  3/2004  Frank et al.
2004/0083362 A1  4/2004  Park et al.

OTHER PUBLICATIONS

"Part 15.3 Wireless Medium Access Control and Physical layer Specifications for High Rate Wireless Personal Area Networks (WPANs)," IEEE STD 802.15.3-2003, IEEE, US, Sep. 29, 2003, pp. 1-315, XPO02342619, pp. 107-116, pp. 221-242.
IEEE Computer Society: "802.11i IEEE Standard for Information Technology—Telecommunications and Information Exchange Between Systems—Local and Metropolitan Area Networks—Specific Requirements; Part 11: Wireless LAN MAC and PHY Specifications; Amendment 6: MAC Security Enhancements" Online, Jul. 23, 2004, pp. 0-175, XP 002402752, Internet URL:http://ieeexplore.ieee.org/, pp. 35-38, pp. 43-46.
International Search Report for PCT/US2005/039883, dated Oct. 30, 2006.

* cited by examiner

*Primary Examiner*—Ellen Tran
(74) *Attorney, Agent, or Firm*—Alston & Bird LLP

(57) ABSTRACT

Systems and methods are presented for achieving various operational modes of packetized wireless network communication, specifically IEEE 802.11 Wireless LAN (WLAN), 802.16 Wireless MAN and WiMAX communication. By providing for various operational modes an increase in the overall security of the wireless network can be realized. The invention is based on the application of a single cryptosystem and on the application of multiple cryptosystems. The invention addresses to aspects of WLAN security, namely, the protection of the information transmitted through the radio link of WLANs, and the invisibility of the network equipment, such as Access Points (APs), to unauthorized adapters.

45 Claims, 11 Drawing Sheets

SYSTEMS AND METHODS FOR THE APPLICATION OF CRYPTOSYSTEMS TO THE DATA LINK LAYER OF PACKETIZED WIRELESS NETWORKS

FIELD OF THE INVENTION

The present invention relates to wireless network communication and, more specifically to the application of cryptosystems to the data link layer of wireless network communication, such as Wireless Local Area Networks (WLAN) to provide for various operational modes that provide additional security to the wireless communication.

BACKGROUND OF THE INVENTION

Research has indicated that the perceived insecurity of wireless networks is a major inhibitor to further market growth. How the security problems affect the user depends on the user's goals and the type of network that the user is using or building. For example, community networks may be deployed to give away Internet access to the masses, and securing the network from end-user access is not a goal. However, from the opposite perspective, a wireless extension of an internal network at a bank or other financial institution will undoubtedly require strong user authentication to prevent unauthorized users, as well as strong privacy protection to keep information confidential. In the middle are commercial "hot-spot" networks which do not need to provide privacy protection, but do need to restrict use of the network to paying customers.

These examples make light of three of the most significant security concerns that plague wireless networks and, specifically Wireless Local Area Networks (WLANs). First, authenticity of users, i.e., making certain that only those users authorized to use the wireless network are allowed to use the network. Second, the privacy of the signal transmitted through the wireless link, i.e., making certain that the communications that are being wirelessly transmitted are not being intercepted, either intentional or unintentionally, by third parties. And third, the invisibility of the Access Points (APs) to unauthorized adapters.

Up until recently restriction of access to a wireless network in the IEEE (Institute of Electrical and Electronics Engineers) 802.11 standard WLAN communication was limited to one standardized provision that required implementing the Wired Equivalent Privacy (WEP) specification. Although WEP was the first serious attempt to fix the insecurity of wireless LANs, it was hampered from the beginning because it was designed during the era when the U.S. government prevented the export of cryptographic products with long key lengths. As such, WEP secret keys were initially limited to 40 bits, the longest, exportable key length allowed at the time. WEP was also limited by the complexity of 802.11 itself. The 802.11 MAC is quite complex and takes a great deal of processing power to run. The additional burden imposed by cryptography was too much for a number of early products, which simply chose not to implement WEP. In addition to limitations on the strength of the cryptography that could be used, WEP has always been an option feature of the standard. 802.11-compliant products are not required to implement WEP. Increasingly WEP gained acceptance as users became aware of the vulnerability of wireless networks and WEP provided the only viable option.

However, WEP does not provide for foolproof security protection of wireless networks. Detractors have argued that key reuse and weak message authentication plague WEP. In addition, WEP provides weaknesses of 802.11 access control mechanisms, even those based on WEP's cryptographic authentication. The weak message authentication aspect of WEP may make it possible to inject traffic into the wireless network. Subsequent long-key length versions of WEP were released, however, the inherent flaws in WEP were not due to short-key.

A flaw was discovered in the WEP "key scheduling algorithm" of the underlying cryptography, RSA's RC4 algorithm. The flaw determined that a number of RC4 keys were fundamentally weak, and would allow a passive listener to recover the secret WEP key simply by collecting a sufficient number of frames encrypted with weak keys.

While WEP was designed to provide both authentication of users and privacy of the signal transmitted, in actuality it provided limited security in both areas. To address the authentication problem, the 802.11 working group adopted the 802.1x standard, which provided "per-port user authentication". It was designed to require user authentication before gaining network access. However, because it was designed for a wired network with fixed physical topology and the wireless network has a very different physical topology, it is much easier to inject messages into an authentication sequence or hijack authorized sessions in the absence of strong mutual authentication and integrity checks. Even with these flaws, 802.1x appeared to be a far better user-authentication solution than WEP.

IEEE 802.11i is yet another form of wireless security standardization. It takes 802.1x as its base and adds several features for wireless networks. The most notable addition is that 802.11i includes a key distribution framework, which should replace the static, manually-configured WEP key. 802.11i also allows the use of the AES encryption algorithm.

In addition to WEP, and 802.11i other recent innovations in wireless network security such as Dynamic WEP, Wi-Fi Protected Access (WPA) and the like have also been implemented. WPA provides improved encryption and simple, but robust, user authentication that even home wireless networkers are able to use. However all of the current security solutions currently available only address the first two issues mentioned above; (1) authentication of users and (2) privacy of the signal transmitted through the wireless link. In order to make WLANs as secure as their wired LAN counterparts, the third issue must be properly addressed, namely (3) invisibility of the Access Points (APs) to authorized adapters. With such invisibility of the APs, described herein by the term "hidden mode", the WLAN becomes identical to a wired LAN.

Additionally, as described above WLAN security is a work in progress and security measures appear to be evolving as need dictates. Today's WLANs, for example need to be able to support multiple security protocols, such as WEP, the Temporal Key Integrity Protocol (TKIP) of WPA and the like. As such, system developers will have no choice but to implement multiple cryptosystems in future WLAN components.

Therefore a need exists to develop a security measure for WLAN implementation that provides for the invisibility of the Access Points to unauthorized adapters and for the protection of information transmitted through radio-links of WLANs. In addition, a need exists to develop a methodology for handling multiple cryptosystems, as well as, a single cryptosystem, to achieve varying degrees of WLAN security. In addition, a need exists to develop security measures that are compatible with current and future standards, such as 802.11, 802.16 and the like. Additionally, the desired security measures must be implemented without negatively affecting the overall performance of the wireless communication, in terms of data rate and range of communication.

BRIEF SUMMARY OF THE INVENTION

The present invention provides various operational modes for encrypting data link layer wireless network communication, such as IEEE 802.11 WLAN communication, 802.16 Wireless MAN (Metropolitan Area Network) or WiMAX (Worldwide Interoperability for Microwave Access). By providing various operational modes for encryption, overall security of the wireless network, such as 802.11 WLAN, 802.16 Wireless MAN or WiMAX communication, is realized. In particular, the various operational modes provide invisibility to the network access points (APs) to unauthorized adapters and provide the ability to implement multiple cryptosystems to insure a heightened level of security. The encryption or security algorithms that are implemented in the invention may be any current or future encryption or security algorithm that provides security to wireless network communication and, in particular 802.11 WLAN, 802.16 Wireless MAN or WiMAX communication. The invention provides various modes for encrypting communication frames, including encryption of the management frames, encryption of the Media Access Control (MAC) header portion of frames, encryption in conjunction with eXclusive OR (XOR) processing, applying multiple cryptosystems to one or more portions of the frames and the like.

In one embodiment of the present invention, a security system for implementation in a wireless communication network, such as 802.11 WLAN, 802.16 Wireless MAN or WiMAX is defined. The system includes an encryption module, typically embodied in a programmable semiconductor device, which is disposed in the data link layer of the wireless communications network. The module includes a security engine that implements one or more security algorithms to perform encryption key-sequence processing on data sequences of wireless network management frames and a memory module in communication with the security engine that provides the one or more security algorithms with stored encryption data. By encrypting the management frames, the Service Set Identifier (SSID) is hidden from unauthorized adapters which do not possess the valid encryption key. The security system may additionally include a first and second eXclusive OR (XOR) that performs bitwise XOR on the encryption and decryption key sequence and the data sequences of the wireless network management frames resulting in a random binary sequence that acts like an on/off pattern of bit reversal of the encryption sequence.

The invention is also embodied in a related method for providing security to a wireless communication network. The method includes the steps of generating a wireless network management frame including a body portion, encrypting the body portion of the wireless network management frame, communicating, wirelessly, the encrypted wireless network management frame and decrypting the body portion of the wireless network management frame. The method may further entail the step of performing an XOR operation on the encrypted and decrypted body portion of the wireless network management frame. The step of encrypting the body portion of the wireless network management frame may involve a single cryptosystem encryption process or the step may involve multiple encryption processes using multiple cryptosystems. Examples of known cryptosystems include nESA (nDosa Enhanced Security Algorithm), Wired Equivalent Privacy (WEP), Dynamic WEP, Temporal Key Integrity Protocol (TKIP) of Wi-Fi Protected Access (WPA), 3DES (Triple Data Encryption Standard) and AES (Advanced Encryption Standard). In addition to encrypting the body portion of the management frame, the method may include encrypting the Media Access Control (MAC) header portion of the wireless network management frame.

In addition to encrypting the management frames, the method may also provide for the generation of wireless network data frames including a body portion, the encryption of the body portion of the wireless network data frame, the communication, wirelessly, of the encrypted wireless network data frame and the decryption of the body portion of the wireless network data frame. In methods in which both the management and data frames are encrypted, the encryption may occur by a single cryptosystem algorithm or the encryption may occur by encryption algorithms from different cryptosystems.

In another embodiment of the present invention, a security system for implementation in a wireless communication network, such as 802.11 WLAN, 802.16 Wireless MAN or WiMAX is defined. The system includes an encryption module, typically implemented on a programmable semiconductor device, which is disposed in the data link layer of the wireless communications network. The module includes a security engine that implements one or more security algorithms to perform encryption key sequence processing on Media Access Control (MAC) header sequences of wireless network frames and a memory module in communication with the security engine that provides the one or more security algorithms with stored encryption data. By encrypting the Mac header portion of the frame the wireless network access points are invisible to unauthorized users so that they are not even aware of the existence of a network. The system may additionally include a first and second XOR that performs bitwise XOR on the encryption and decryption key sequences and the MAC header sequences of the wireless network frames resulting in encrypted and XORed transmission MAC header sequences of the wireless network frames. The wireless frames that undergo MAC header encryption may be data frames, management frames or both data and management frames.

The invention is also embodied in a related method for providing security to a wireless communication network. The method includes the steps of generating a wireless network frame including a Media Access Control (MAC) header portion, encrypting the MAC header portion of the wireless network frame, communicating, wirelessly, the MAC header encrypted wireless network frame and decrypting the MAC header portion of the wireless network frame. In addition, the method may include the steps of performing an XOR operation on the encrypted and decrypted MAC header portion of the wireless network frame. The encryption of the MAC header may entail a single encryption process or the encryption may entail a multiple encryption by implementing a plurality of different cryptosystem algorithms. The wireless frames that undergo the MAC header encryption method may be data frames, management frames or both data and management frames. In addition to encrypting the MAC header portion of the frame, the method may also include encrypting the body portion of the frame, as well as, performing an XOR operation on the body portion. In those instances in which the body portion is encrypted it may involve a single encryption process or multiple encryption processes.

Additionally, the invention is embodied in an encryption system for implementing a wireless communication network, such as 802.11 WLAN, 802.16 Wireless MAN or WiMAX. The system includes an encryption module, typically implemented on a programmable semiconductor device that is disposed in the data link layer of the wireless communication network. The module includes a security engine that implements one or more encryption algorithms to perform encryption key sequence processing on at least some data sequences of wireless network frames, a memory module in communication with the security engine that provides the one or more encryption algorithms with stored encryption data and a first XOR that performs bitwise XOR on the encryption key sequence and the transmission data sequences resulting in encrypted XORed transmission data sequences of the wireless network frames. The system will typically also include a XOR that performs bitwise XOR on a decryption key sequence and the data sequences of the wireless network frames resulting in decrypted received data sequences of the wireless network frames.

A corresponding method is also embodied in the invention that provides for security to a wireless communication network, such as 802.11 WLAN, 802.16 Wireless MAN or WiMAX. The method includes the steps of generating a wireless network frame, encrypting at least a portion of the wireless network frame, performing a bitwise XOR operation on an encryption key sequence and the at least a portion of the wireless network frame, communicating, wirelessly, the encrypted and XORed wireless network frame, performing a bitwise XOR operation on a decryption key sequence and the at least a portion of the wireless network frame and decrypting the at least a portion of the wireless network frame. The encryption step may involve encrypting at least a portion of the wireless network frame with a plurality of different cryptosystem algorithms or a single cryptosystem algorithm. Additionally, the bitwise XOR operation may be performed on the MAC header portion, the frame body portion or any other portion of the frame. The random XOR pattern chosen to perform the XOR operation may be a personal ID, a password, a work group ID, personal biographical data, or a random sequence.

The invention is also embodied in a security system for implementation in a wireless communication network, such as 802.11 WLAN, 802.16 Wireless MAN or WiMAX. The system includes an encryption module that is disposed in the data link layer of the wireless communications network. The module includes a security engine that implements a plurality of security algorithms to perform encryption key sequence processing on data sequences of wireless network frames and a memory module in communication with the security engine that provides the plurality of security algorithms with stored encryption data. The encryption module may further include a first and second eXclusive OR (XOR) that performs bitwise XOR on one or more encryption and decryption key sequences and the data sequences of the wireless network frames resulting in encrypted and XORed transmission data sequences of the wireless network frames.

A corresponding method may be provided for in an embodiment of the invention for providing security to a wireless communication network. The method includes the steps of generating a wireless network frame, providing a plurality of encryption operations to at least a portion of the wireless network frame, resulting in a multi-encrypted wireless network frame, communicating, wirelessly, the multi-encrypted wireless network frame and decrypting the multi-encrypted wireless network frame. The step of providing a plurality of encryption operations to at least a portion of the wireless network frame, resulting in a multi-encrypted wireless network frame may further provide for the encryption operations to occur simultaneously. In addition, one or more eXclusive OR (XOR) operations may be performed in conjunction with one or more of the plurality of encryption operations.

Thus, the present invention provides various operational modes for encrypting data link layer wireless network communication, such as IEEE 802.11 WLAN, 802.16 Wireless MAN or WiMAX communication. By providing various operational modes for encryption, overall security of the wireless network, such as 802.11 WLAN, 802.16 Wireless MAN or WiMAX communication, is realized. In particular, the various operational modes provide invisibility to the network access points (APs) to unauthorized adapters and provide the ability to implement multiple cryptosystems to insure a heightened level of security. The encryption or security algorithms that are implemented in the invention may be any current or future encryption or security algorithm that provides security to wireless network communication and, in particular 802.11 WLAN, 802.16 Wireless MAN or WiMAX communication. The invention provides various modes for encrypting communication frames, including encryption of the management frames, encryption of the Media Access Control (MAC) header portion of frames, encryption in conjunction with eXclusive OR (XOR) processing, applying multiple cryptosystems to one or more portions of the frames and the like.

BRIEF DESCRIPTION OF THE DRAWINGS

Figure 1:
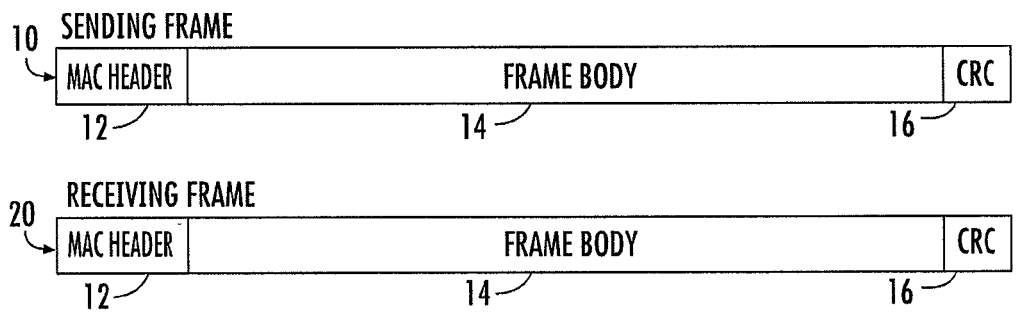

Having thus described the invention in general terms, reference will now be made to the accompanying drawings, which are not necessarily drawn to scale, and wherein:

FIG. 1 illustrates examples of the transmitting and receiving frames in Open System Mode (OSM) of the current Wireless Local Area Network (WLAN) standard, IEEE (Institute of Electrical and Electronics Engineers) 802.11b. In this mode, no encryption is applied to the Data Link layer. This figure is in accordance with the prior art.

Figure 2:
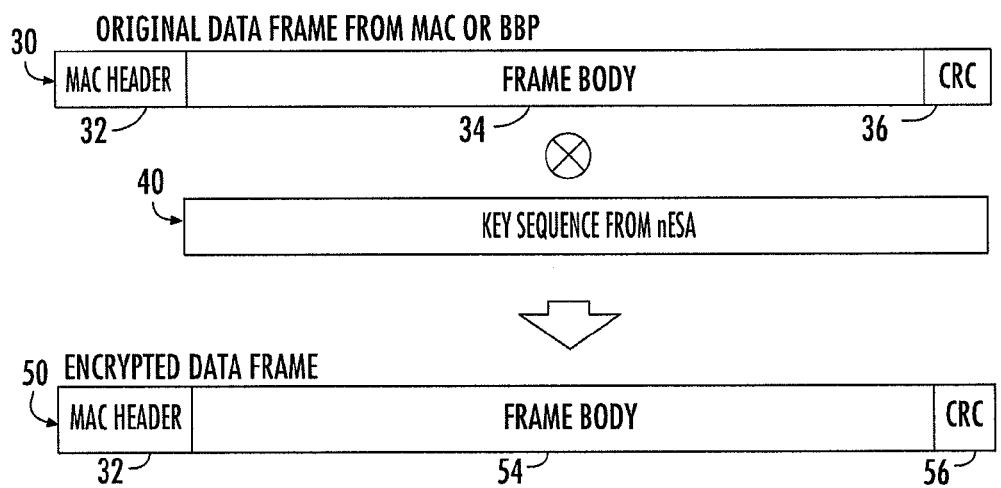

FIG. 2 illustrates a first operational mode of encryption in which only the data field of the WLAN data frames are encrypted, in accordance with an embodiment of the present invention.

Figure 3:
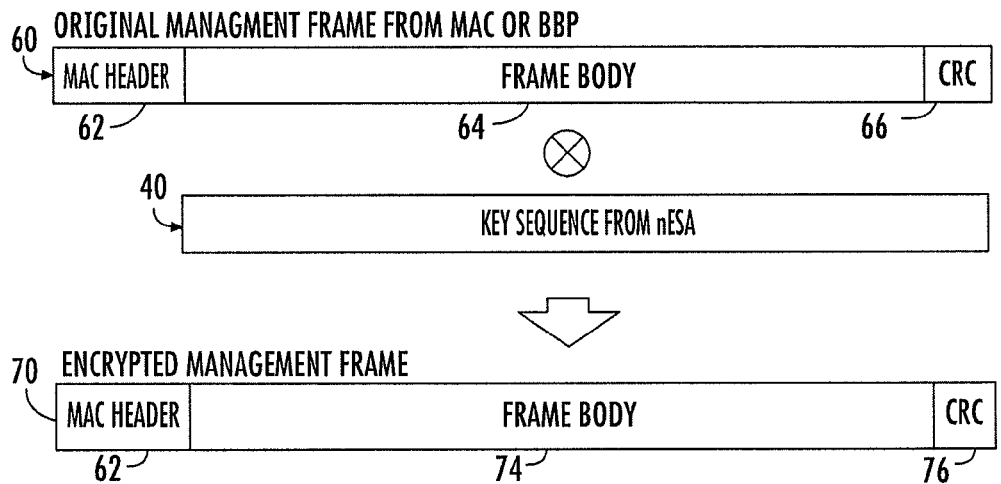

FIG. 3 illustrates a second operational mode of encryption in which only the frame body of WLAN management frames are encrypted, in accordance with an embodiment of the present invention.

Figure 4:
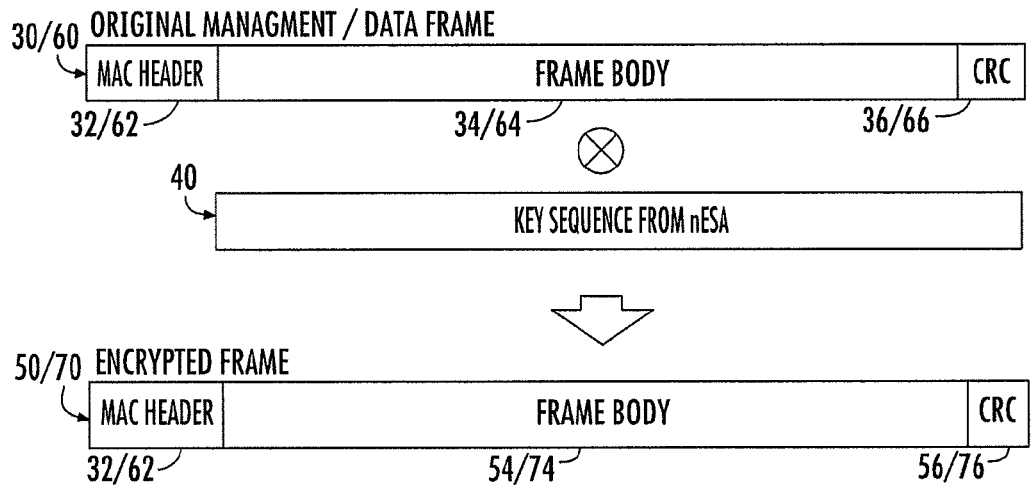

FIG. 4 illustrates a third operational mode of encryption which combines the first and second modes to encrypt both the data field of the WLAN data frames and the frame body of the WLAN management frames, in accordance with an embodiment of the present invention.

Figure 5:
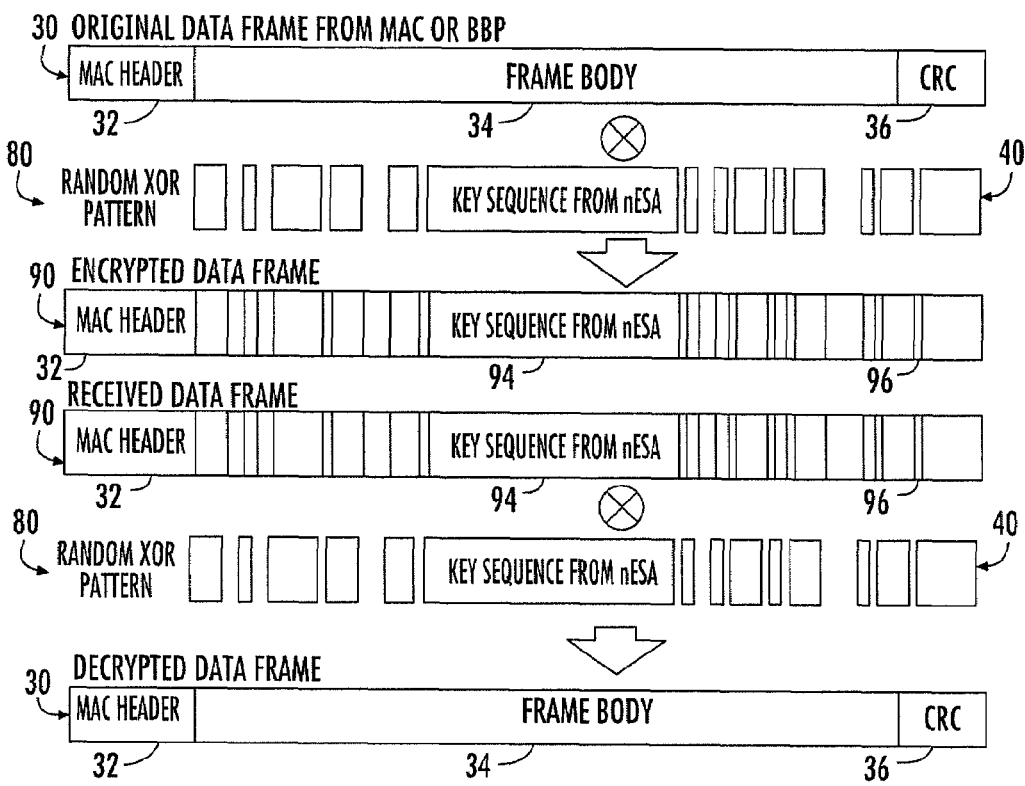

FIG. 5 illustrates a fourth operational mode of encryption in which the data filed of the WLAN data frames are encrypted and an XOR (Exclusive OR) operation is applied, in accordance with an embodiment of the present invention.

Figure 6:
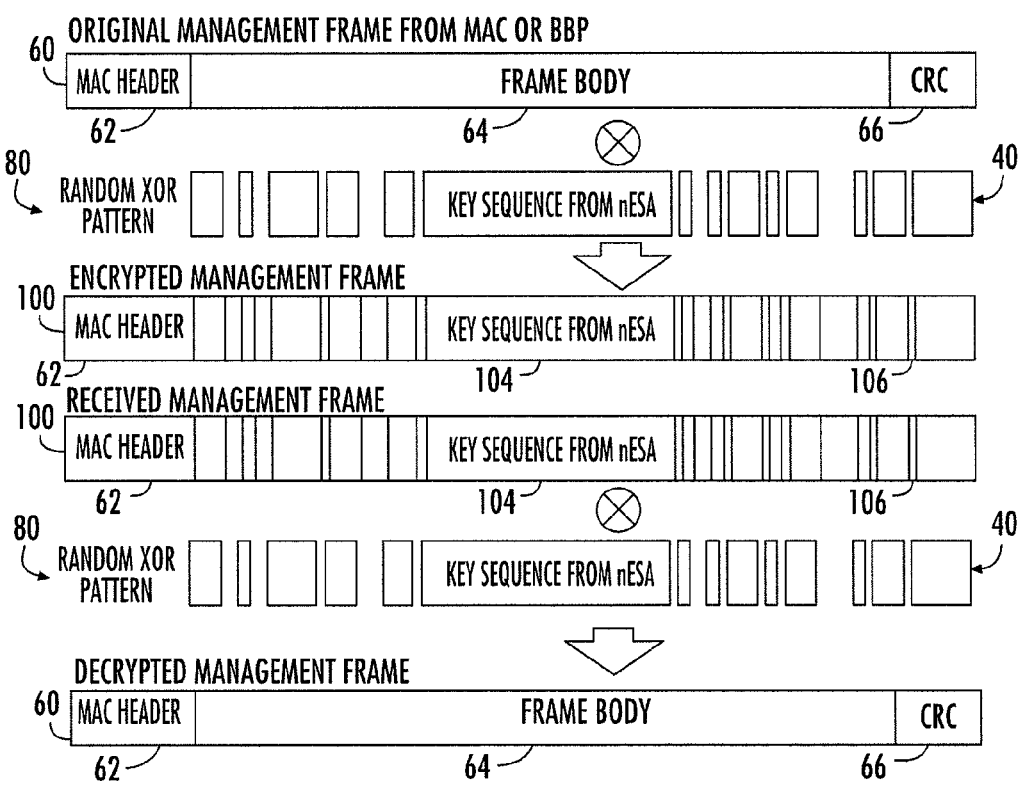

FIG. 6 illustrates a fifth operational mode of encryption in which the frame body of the WLAN management frames are encrypted and an XOR operation is applied, in accordance with an embodiment of the present invention.

Figure 7:
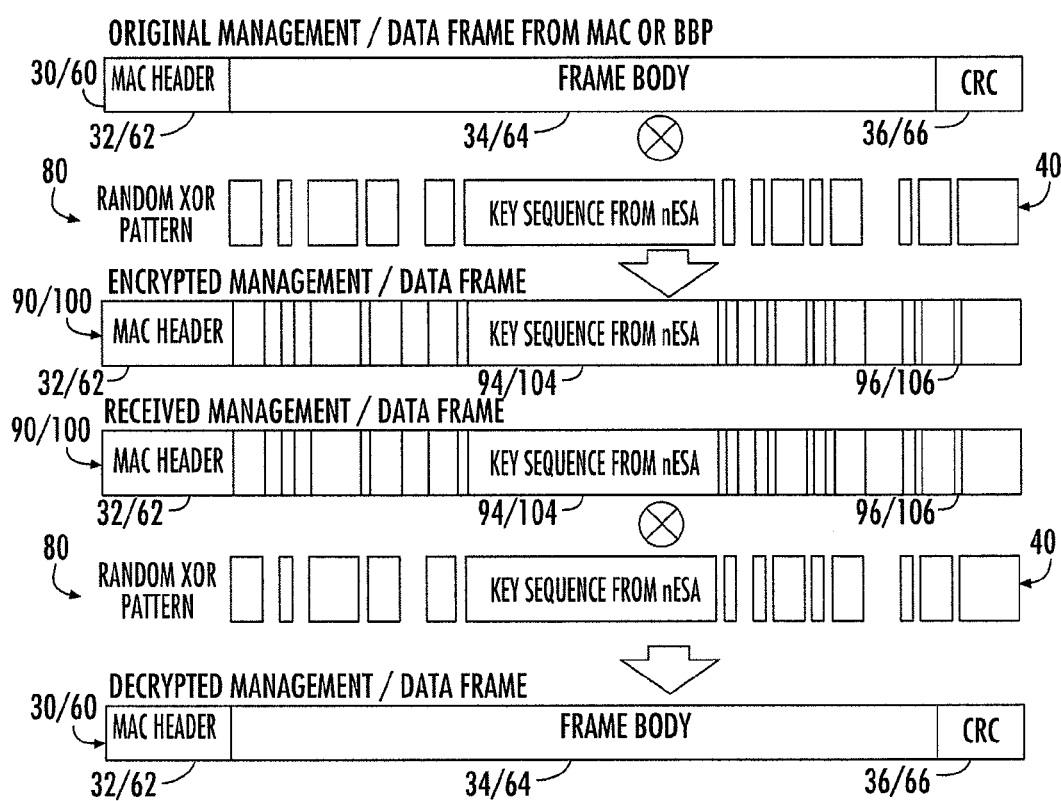

FIG. 7 illustrates a sixth operational mode of encryption which combines the fourth and fifth modes to encrypt both the data field of the WLAN data frames and the frame body of the WLAN management frames and to apply an XOR operation to both the WLAN data frames and the WLAN management frames, in accordance with an embodiment of the present invention.

Figure 8:
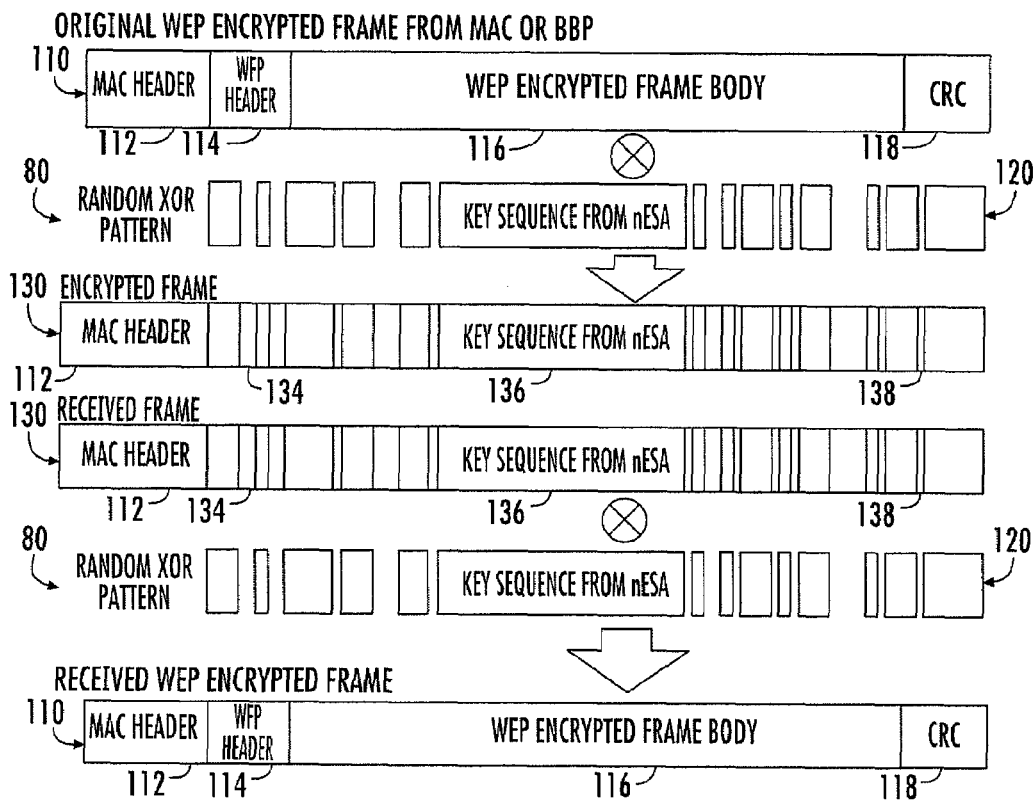

FIG. 8 illustrates an example of a dual encryption mode which combines two independent cryptosystems, in accordance with an embodiment of the present invention.

Figure 9:
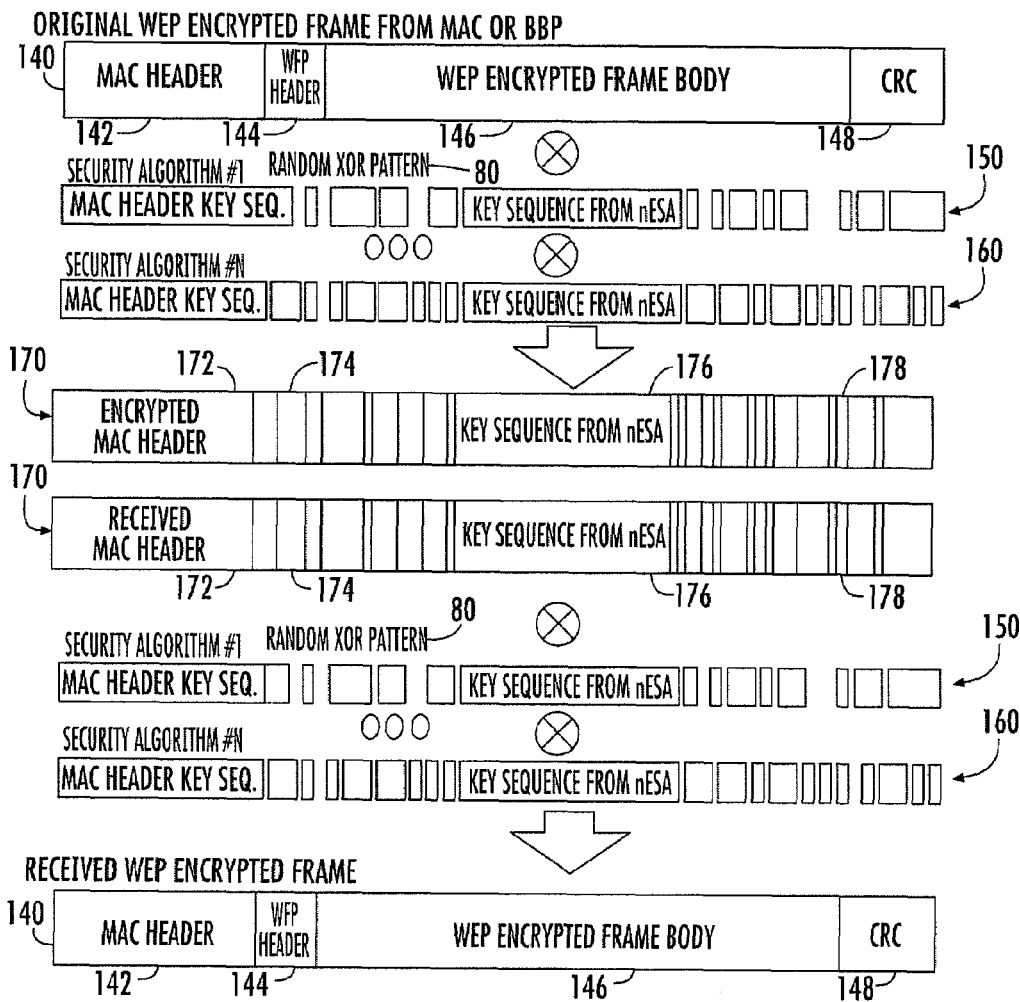

FIG. 9 illustrates an example of a multi-encryption mode which combines more than two independent cryptosystems together with MAC header encryption, in accordance with an embodiment of the present invention.

Figure 10:
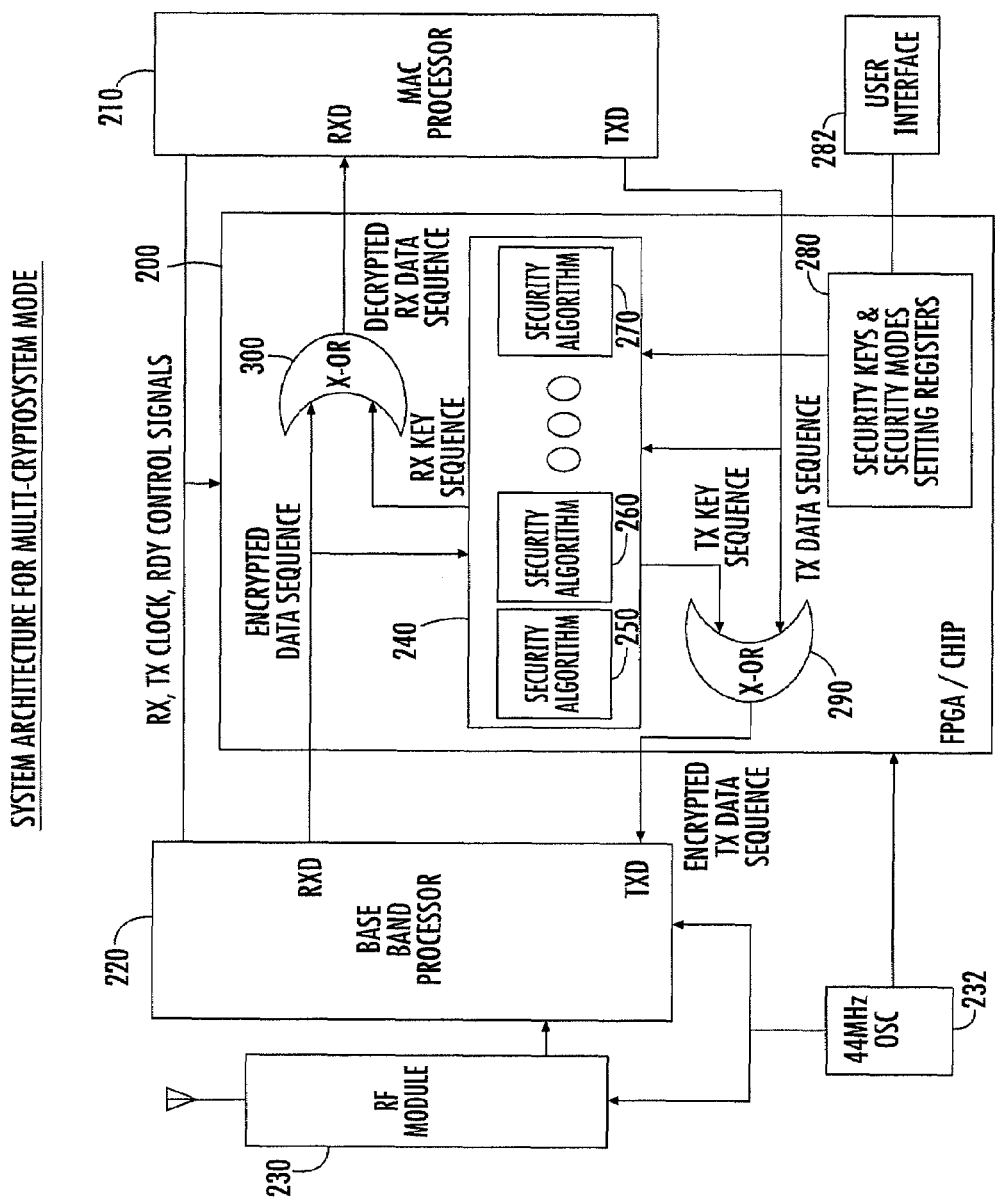

FIG. 10 illustrates a block diagram of a system for supporting the encryption modes related to the invention, in accordance with an embodiment of the present invention.

Figure 11:
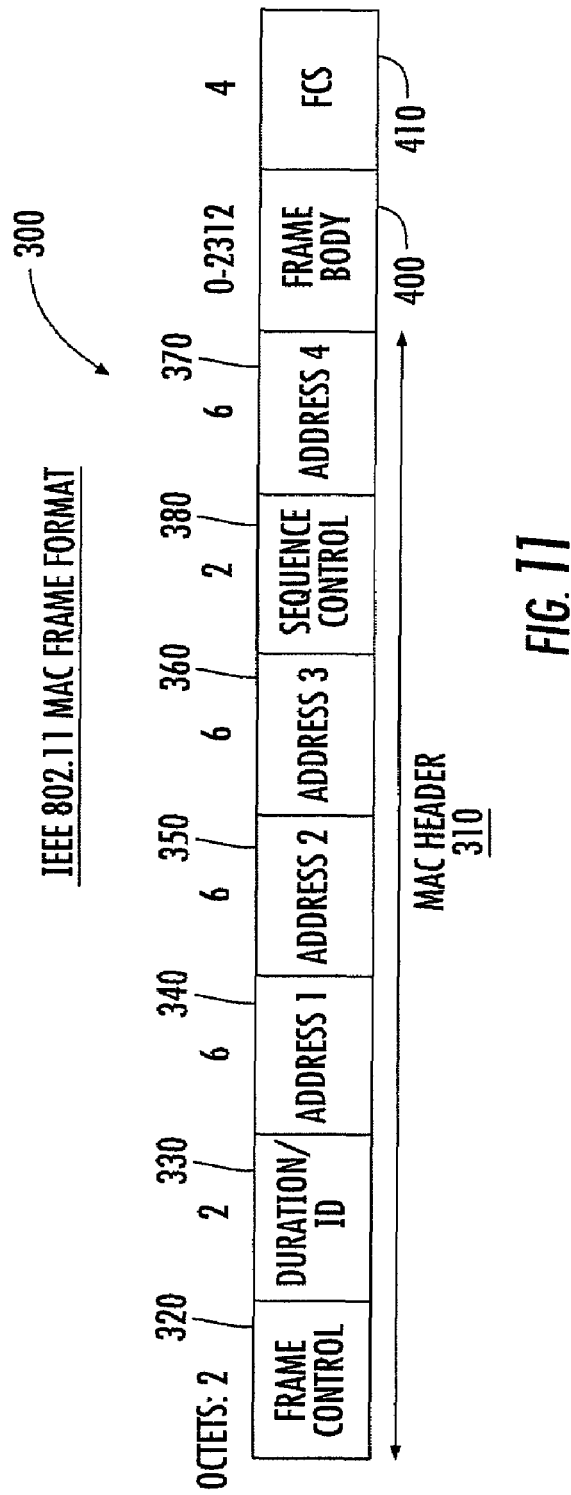

FIG. 11 illustrates a standard IEEE 802.11 MAC frame format, in accordance with the prior art.

Figure 12:
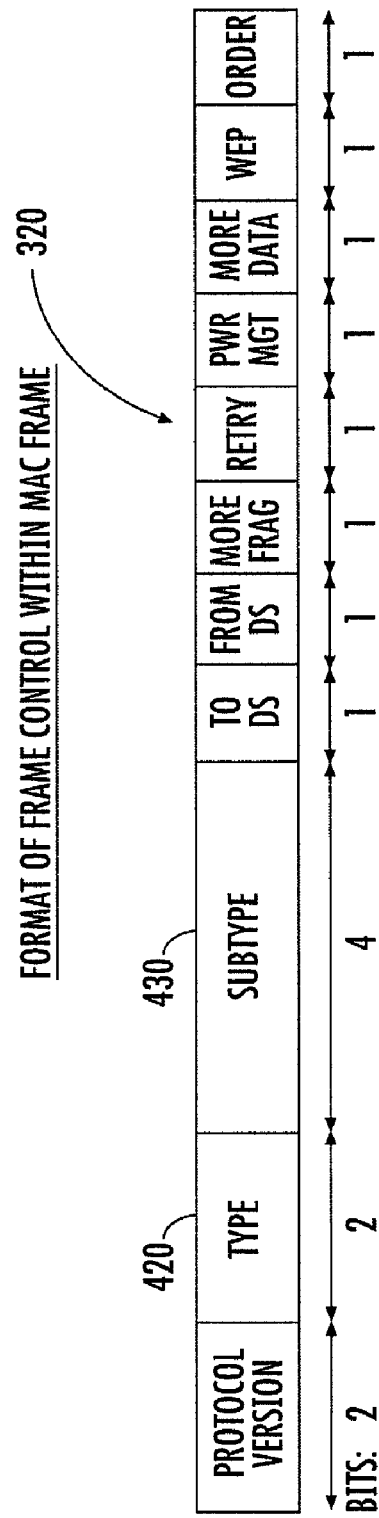

FIG. 12 illustrates a standard IEEE 802.11 frame control format of a MAC frame, in accordance with the prior art.

Figure 13:
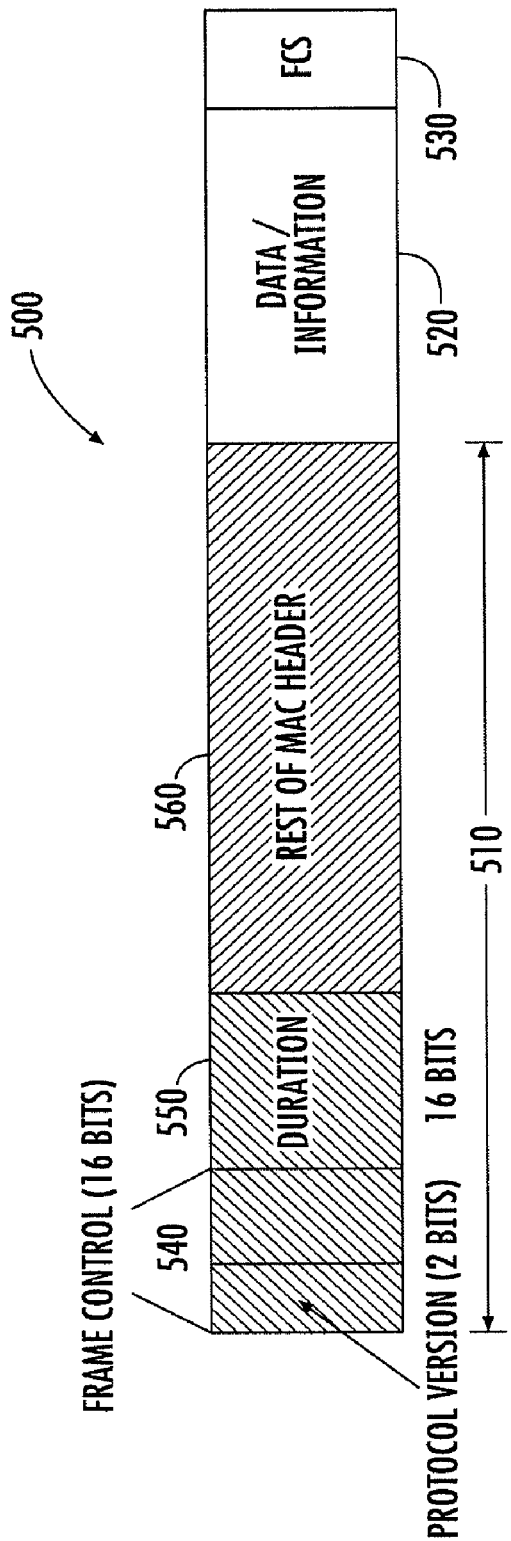

FIG. 13 illustrates an example of an encrypted IEEE 802.11 MAC header of a MAC frame, in accordance with an embodiment of the present invention.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention provides various operational modes for encrypting data link layer wireless network communication, such as IEEE 802.11 WLAN, 802.16 Wireless MAN or WiMAX communication. By providing various operational modes for encryption overall security of the wireless network, such as 802.11 WLAN, 802.16 Wireless MAN or WiMAX communication, is realized. In particular, the various operational modes provide invisibility to the network access points (APs) to unauthorized adapters and provide the ability to implement multiple cryptosystems to insure a heightened level of security. The encryption or security algorithm that is implemented in the invention may be any current or future encryption or security algorithm that provides security to wireless network communication and, in particular 802.11 WLAN communication, 802.16 Wireless MAN or WiMAX. Examples of such security algorithms include, but are not limited to, Wired Equivalent Privacy (WEP), Dynamic WEP, IEEE 802.11e, Temporal Key Integrity Protocol (TKIP) of Wi-Fi Protected Access (WPA), 3DES (Triple Data Encryption Standard), AES (Advanced Encryption Standard) and the nESA (nDosa Enhanced Security Algorithm) designed by nDosa Technologies, Inc, of Fairfield, N.J., United States of America. For a more detailed discussion of the nESA security algorithm see U.S. patent application Ser. No. 10/617,642 entitled "Cryptographic Method and Computer Program product for use in Wireless Local Area Networks" filed on Jul. 11, 2003 in the name of inventors Park et al, and assigned to the same inventive entity as the present invention. That application is herein incorporated by reference as if set forth fully herein.

In accordance with an embodiment of the present invention, a multi-operational mode security system is provided for increasing the overall security of a wireless communication network, in particular the IEEE 802.11 WLAN, 802.16 Wireless MAN or WiMAX. FIG. 1 provides an example of transmitting and receiving IEEE 802.11 WLAN data frames in the standard operational communication mode without any security precautions, i.e., no security or encryption algorithms are applied to the data frames. Hence, FIG. 1 is in accordance with the prior art. The transmitting or sending frame 10 includes a MAC (Media Access Control) header portion 12 that includes the critical information for insuring proper communication, such as MAC address, frame type, sequence control and the like. The sending frame will also include a frame or data body portion 14 that includes the data being transmitted and a Cyclic Redundancy Check (CRC) portion 16 that insures that the communication is correct and error-free. The transmitted or receiving frame 20 is identical to the sending frame, in that, it includes identical MAC header portion 12, frame body portion 14 and CRC portion 16. In this operational mode the communication lacks security and the privacy of the signal transmitted through the wireless link is seriously compromised.

Various Operational Modes for Providing Security to a Wireless Network

FIG. 2 provides an example of a first operational mode of security protection in a wireless communication network, such as 802.11 WLAN, 802.16 Wireless MAN, WiMAX or the like, in accordance with an embodiment of the present invention. The first mode is otherwise referred to herein as the data protection mode. The first mode is a standard WEP-like mode typically designated for individual users with lesser security concerns. As previously noted, the particular cryptosystem that is chosen for encryption is not limited by the invention. Any known or future encryption system/algorithm may be used without departing from the inventive concepts herein disclosed. For example, nESA, TKIP, 3DES, AES or the like may be used, as well as any other cryptosystems. In the embodiments illustrated here, the nESA system is used by way of example only. The sending data frame 30 includes a MAC header portion 32, frame body portion 34 and CRC portion 36. An encryption algorithm 40, otherwise referred to as a key sequence such as nESA or the like is applied, at the data link layer, to the frame body or data portion 34 of the sending data frame. In addition, the key sequence may be applied to, but is not required to be applied to, the CRC portion. The resulting frame, which is the frame that is transmitted is an encrypted data frame 50 that includes a MAC header portion 32, an encrypted frame body portion 54 and an encrypted CRC portion 56. Once the transmitted encrypted data frame is communicated to a recipient, the received encrypted data frame is decrypted, using the decryption algorithm of the chosen cryptosystem and a receiving data frame similar to the one shown in FIG. 1 results. The data protection mode provides privacy to the signal transmitted through the wireless link and prevents unauthorized access to the network.

FIG. 3 provides an example of a second operational mode of security protection in a wireless communication network, such as 802.11 WLAN, 802.16 Wireless MAN WiMAX or the like, in accordance with an embodiment of the present invention. It is noted that while this mode is included with the multiple operation mode system of the present invention it also provides for a novel concept, in and of itself, because it provides for invisibility to the APs to unauthorized adapters. The second mode is otherwise referred to as the "basic hidden mode", in that; it provides security protection for communicated management frames. Management frames include, but are not limited to, beacon frames, association response frames, probe response frames, and the like. The sending management frame 60 includes a MAC header portion 62, frame body portion 64 and a CRC portion 66. An encryption algorithm 40 otherwise referred to as a key sequence such as nESA or the like is applied, at the data link layer, to the frame body or data portion 64 of the sending management frame. While in the illustrated embodiment the encryption algorithm that is used to encrypt the management frames is the same encryption algorithm used to encrypt the data frames, in alternate embodiments the encryption algorithm may vary amongst the operational modes. In addition, the key sequence may be applied to, but is not required to be applied to, the CRC portion. The resulting frame, which is the frame that is transmitted, is an encrypted management frame 70 that includes a MAC header portion 62, an encrypted frame body portion 74 and an encrypted CRC portion 76. Once the transmitted encrypted management frame is communicated to a recipient, the received encrypted management frame is decrypted, using the decryption algorithm of the chosen cryptosystem and a receiving management frame similar to the one shown in FIG. 1 results. The second operational mode or the basic hidden mode hides the Service Set Identity (SSID) from unauthorized adapters which are not privy to the valid encryption key required to decrypt the frame body portion of the management frame. Only those adapters with the valid encryption key can figure out the SSID and successfully establish access to the system. As such, by providing for encryption of the management frames and hiding the SSID from unauthorized adapters, the access points (APs) in the wireless communication network appear as invisible or hidden.

FIG. 4 provides an example of a third operational mode of security protection in a wireless communication network, such as 802.11 WLAN, 802.16 Wireless MAN, WiMAX or the like, in accordance with an embodiment of the present invention. The third operational mode is otherwise referred to as the "secure and basic hidden mode", in that; it combines the first and second operational modes such that both data frames and management frames are encrypted. The third mode will typically provide for secure "hot-spot" services. The sending data or management frame 30 or 60 includes a MAC header portion 32 or 62, frame body portion 34 or 64 and a CRC portion 36 or 66. An encryption algorithm 40 otherwise referred to as a key sequence such as nESA or the like is applied, at the data link layer, to the frame body or data portion 34 or 64 of the sending data and management frame. In addition, the key sequence may be applied to, but is not required to be applied to, the CRC portion. The resulting frame, which is the frame that is transmitted, is an encrypted data or management frame 50 or 70 that includes a MAC header portion 32 or 62, an encrypted frame body portion 54 or 74 and an encrypted CRC portion 56 or 76. Once the transmitted encrypted data or management frame is communicated to a recipient, the received encrypted data or management frame is decrypted, using the decryption algorithm of the chosen cryptosystem and a receiving data or management frame similar to the one shown in FIG. 1 results. The third mode or the secure and basic hidden mode provides WLANs both security as to the privacy of the communication and authorization to access the network and invisibility as to the APs. This is because in the third operational mode all of the communicated frames are encrypted, and only the adapter with the valid security key can obtain the SSID and access the network. The adapter that has the valid security key can also decrypt the data frames by implementing the security key after requisite association. Adapters that do not possess the valid security key cannot extract information about the AP necessary to otherwise access the network.

FIG. 5 provides an example of a fourth operational mode of security protection in a wireless communication network, such as 802.11 WLAN, 802.16 Wireless MAN, WiMAX or the like, in accordance with an embodiment of the present invention. The fourth operational mode mirrors the first operational mode (i.e., the secure mode that encrypts the data frames) and additionally provides for the encryption sequence to be generated by an eXclusive-OR (XOR) operation that results in a random binary sequence. The fourth mode provides personal secure keys to users of the first mode, thus adding additional security. The XOR operation may be provided by the implemented security algorithm, as provided for by the nESA algorithm or the XOR operation may involve an independent user-defined scheme. The random binary sequence that is provided by the XOR operation acts as an on/off pattern of bit reversal of the encryption sequence generated by the encryption algorithm. By creating a unique pattern (i.e., a XOR pattern), users or network administrators are provided an additional level of access control over their network. The encryption security key and the XOR pattern can be arbitrarily set and managed based on time, location, priority constraints or other factors. For example, the random XOR pattern can be a personal ID, password, work group ID, personal bio data, or simply another layer of random sequence, independently created for added security.

In FIG. 5 the sending data frame 30 includes a MAC header portion 32, frame body portion 34 and CRC portion 36. An encryption algorithm 40 otherwise referred to as a key sequence, such as nESA or the like, and a random XOR pattern 80, is applied, at the data link layer, to the frame body or data portion 34 and CRC portion 36 of the sending data frame. The resulting encrypted and XORed data frame 90 includes the MAC header portion 32, the encrypted and XORed frame body 94 and the encrypted and XORed CRC portion 96. The encrypted and XORed data frame 90 is transmitted and received. Once the transmitted encrypted and XORed data frame is communicated and received, the received encrypted and XORed data frame 90 is decrypted, using the decryption portion of the cryptosystem algorithm 40 and the corresponding XOR pattern 80. As a result of the decryption process, the decrypted data frame will be identical to the sending data frame 30.

FIG. 6 provides an example of a fifth operational mode of security protection in a wireless communication network, such as 802.11 WLAN, 802.16 Wireless MAN, WiMAX or the like, in accordance with an embodiment of the present invention. The fifth operational mode mirrors the second operational mode (i.e., the hidden mode that encrypts the management frames) and additionally provides for the encryption sequence to be generated by an eXclusive-OR (XOR) operation that results in a random binary sequence. The encryption security key and the XOR pattern can be arbitrarily set and managed based on time, location, priority constraints or other factors. The sending management frame 60 includes a MAC header portion 62, frame body portion 64 and CRC portion 66. An encryption algorithm 40 otherwise referred to as a key sequence, such as nESA or the like, and a random XOR pattern 80, is applied, at the data link layer, to the frame body or data portion 64 and CRC portion 66 of the sending data frame. The resulting encrypted and XORed management frame 100 includes the MAC header portion 62, the encrypted and XORed frame body 104 and the encrypted and XORed CRC portion 106. The encrypted and XORed management frame 100 is subsequently transmitted and received. Once the transmitted encrypted and XORed management frame is communicated and received, the received encrypted and XORed management frame 100 is decrypted, using the decryption portion of the cryptosystem algorithm 40 and the corresponding XOR pattern 80. As a result of the decryption process, the decrypted management frame will be identical to the sending management frame 60.

FIG. 6 provides an example of a fifth operational mode of security protection in a wireless communication network, such as 802.11 WLAN, 802.46 Wireless MAN, WiMAX or the like, in accordance with an embodiment of the present invention. The fifth operational mode mirrors the second operational mode (i.e., the basic hidden mode that encrypts the management frames) and additionally provides for the encryption sequence to be generated by an eXclusive-OR (XOR) operation that results in a random binary sequence. The encryption security key and the XOR pattern can be arbitrarily set and managed based on time, location, priority constraints or other factors. The sending management frame 60 includes a MAC header portion 62, frame body portion 64 and CRC portion 66. An encryption algorithm 40 otherwise referred to as a key sequence, such as nESA or the like, and a random XOR pattern 80, is applied, at the data link layer, to the frame body or data portion 64 and CRC portion 66 of the sending data frame. The resulting encrypted and XORed management frame 100 includes the MAC header portion 62, the encrypted and XORed frame body 104 and the encrypted and XORed CRC portion 106. The encrypted and XORed management frame 100 is subsequently transmitted and received. Once the transmitted encrypted and XORed management frame is communicated and received, the received encrypted and XORed management frame 100 is decrypted, using the decryption portion of the cryptosystem algorithm 40 and the corresponding XOR pattern 80. As a result of the decryption process, the decrypted management frame will be identical to the sending management frame 60.

FIG. 7 provides an example of a sixth operational mode of security protection in a wireless communication network, such as 802.11 WLAN, 802.16 Wireless MAN or WiMAX or the like, in accordance with an embodiment of the present invention. The sixth operational mode mirrors the third operational mode (i.e., the secure and basic hidden mode that encrypts the data frames and the management frames) and additionally provides for the encryption sequence to be generated by an eXclusive-OR (XOR) operation that results in a random binary sequence. The sixth provides user-defined and independently generated secure keys to third mode users. The encryption security key and the XOR pattern can be arbitrarily set and managed based on time, location, priority constraints or other factors. The sending management or data frame 30 or 60 includes a MAC header portion 32 or 62, frame body portion 34 or 64 and CRC portion 36 or 66. An encryption algorithm 40 otherwise referred to as a key sequence, such as nESA or the like, and a random XOR pattern 80, is applied, at the data link layer, to the frame body or data portion 34 and 64 and CRC portion 36 or 66 of the sending data or management frame. The resulting encrypted and XORed data or management frame 90 or 100 includes the MAC header portion 32 or 62, the encrypted and XORed frame body 94 or 104 and the encrypted and XORed CRC portion 96 or 106. The encrypted and XORed data or management frame 90 or 100 is subsequently transmitted and received. Once the transmitted encrypted and XORed data or management frame is communicated and received, the received encrypted and XORed data or management frame 90 or 100 is decrypted, using the decryption portion of the cryptosystem algorithm 40 and the corresponding XOR pattern 80. As a result of the decryption process, the decrypted data or management frame will be identical to the sending data or management frame 30 or 60.

FIG. 8 provides an example of a dual cryptosystem operational mode in which two independent cryptosystems are implemented in unison to provide heightened security to the wireless network communication. The dual cryptosystem mode can be applied to any of the previously discussed six operational modes. It is noted that any cryptosystems may chosen and implemented as the dual cryptosystems in the wireless communication system. The dual cryptosystem mode provides basic hidden mode security to individuals using WEP or enterprise customers using WAP or 801.11i security. In the illustrated embodiment of FIG. 8 the WEP cryptosystem is used as the first cryptosystem and the nESA cryptosystem is used as the second cryptosystem. In addition, in the illustrated embodiment the XOR operation is used in conjunction with the second cryptosystem. However, dual cryptosystem operational mode may be implemented without the added security benefit of the XOR operation. The initial frame illustrated in FIG. 8 has previously undergone a first encryption process, by way of example WEP encryption. The first encrypted frame 110 may be a data frame, a management frame or the mode may dictate encryption of both data and management frames. The first encrypted frame 110 includes a MAC header portion 112, a first encryption header portion 114, a first encrypted frame body portion 116 and a CRC portion 118. A second encryption algorithm 120 otherwise referred to as a second key sequence, such as nESA or the like, and a random XOR pattern 80, is applied, at the data link layer, to the first encrypted frame body or data portion 116 and CRC portion 118 of the first encrypted frame 110. The resulting first and second encrypted and XORed frame 130 includes the MAC header portion 112, the second encrypted and XORed, first encryption header portion 134, a first and second encrypted and XORed frame body portion 136 and a second encrypted and XORed CRC portion 138. The first and second encrypted and XORed frame 120 is subsequently transmitted and received. Once the transmitted first and second encrypted and XORed frame is communicated and received, the received first and second encrypted and XORed frame 120 is decrypted, using the decryption portion of the second cryptosystem algorithm 40 and the corresponding XOR pattern 80. As a result of the decryption process, the frame will be identical to the first encrypted frame 110. Subsequent decryption of the first encrypted frame 110 (not shown in FIG. 8) will be required in order to provide for a communication that is discernable to the recipient/user.

FIG. 9 provides an example of a multi-cryptosystem operational mode in which more than two independent cryptosystems are implemented in combination to provide heightened security to the wireless network communication. The multi cryptosystem mode can be applied to any of the previously discussed six operational modes. It is noted that any known or future cryptosystem may be chosen and implemented as one of the multiple cryptosystems in this operational mode. Multi-cryptosystem mode offers enhanced hidden mode, which can prevent network attacks from sophisticated hackers, and is conducive to application in a WLAN environment where extremely stringent security needs exist, such as government and military institutions, wireless financial transactions, and the healthcare/insurance/pharmaceutical industry. In the illustrated embodiment of FIG. 9 the WEP cryptosystem is used as the first cryptosystem, a first mode of nESA encryption provides the second cryptosystem for the frame body and a second mode of nESA encryption provides the nth cryptosystem. In addition, in the illustrated embodiment the XOR operation is used in conjunction with the second cryptosystem and may be implemented in conjunction with any other of the multiple cryptosystems. However, multiple cryptosystem operational modes may be implemented without the added security benefit of the XOR operation. It is also noted that in this illustrated embodiment the second cryptosystem, as well as the nth cryptosystem provide for encryption of the MAC header portion of the frame. More detail concerning MAC header encryption, also referred to herein as advanced hidden operational mode, will be provided infra. However, it should be obvious to those skilled in the art that MAC header encryption is not required to be performed in a multi-cryptosystem operational mode The initial frame illustrated in FIG. 9 has previously undergone a first encryption process, by way of example WEP encryption. The first encrypted frame 140 may be a data frame, a management frame or the mode may dictate encryption of both data and management frames. The first encrypted frame 140 includes a MAC header portion 142, a first encryption header portion 144, a first encrypted frame body portion 146 and a CRC portion 148. A second encryption algorithm 150, otherwise referred to as a second key sequence, such as a first mode of nESA or the like, and a random XOR pattern 80, is applied, at the data link layer, to the MAC header portion 142, the first encryption header portion 144, the first encrypted frame body or data portion 146 and CRC portion 148 of the first encrypted frame 140. Subsequent security algorithms may be applied prior to application of the last security algorithm in the sequence herein referred to as the nth encryption algorithm. An nth encryption algorithm 160, otherwise referred to as the nth key sequence, such as a second mode of nESA or the like, is applied, at the data link layer, to the subsequently encrypted MAC header portion, the subsequently encrypted, first encryption header portion, the subsequently encrypted frame body and the subsequently encrypted CRC portion. The resulting multi-encrypted and XORed frame 170 includes the multi-encrypted MAC header portion 172, the multi-encrypted and XORed, first encryption header portion 174, the multi-encrypted and XORed frame body portion 176 and the multi-encrypted and XORed CRC portion 178. The multi-encrypted and XORed frame 170 is subsequently transmitted and received. Once the transmitted multi-encrypted and XORed frame is communicated and received, the received multi-encrypted and XORed frame 170 is decrypted, using the decryption portion of the second cryptosystem algorithm 150 and the corresponding XOR pattern 80 and the decryption portion of all subsequent cryptosystems, including the decryption portion of the nth cryptosystem 160. As a result of the decryption process, the frame will be identical to the first encrypted frame 140. Subsequent decryption of the first encrypted frame 140 (not shown in FIG. 9) will be required in order to provide for a communication that is discernable to the recipient/user.

FIG. 10 provides a block diagram depiction of the overall cryptosystem architecture implemented in the data link layer of a wireless communication network, such as an 802.11 WLAN, 802.16 Wireless MAN, WiMAX or the like, in accordance with an embodiment of the present invention. While the illustrated embodiment depicts a multi-cryptosystem embodiment, the architecture is similar for embodiments of the invention in which a single or dual cryptosystem is implemented. In this embodiment of the invention the encryption module 200 may be implemented physically by a Field Programmable Gate Array (FPGA) device, an Application Specific Integrated Circuit (ASIC) or a similar programmable device. In the embodiment shown the encryption module is disposed on the data link layer between the MAC processor 210 and the base band processor 220. It is also possible for the encryption module to be implemented elsewhere in the data link layer; for example, in an alternate embodiment the encryption module may physically reside within the MAC processor. In the embodiment shown in FIG. 10 data sequences are transmitted from upper layers in the network through the MAC processor 210, encrypted in the encryption module 200, and communicated to the base band processor 220. The base band processor converts the data sequences to RF signals and the signals are transmitted via the RF module 230. Incoming communications are received at the RF module, converted from RF signals to data sequences at the base band processor, decrypted at the encryption module and communicated to the MAC processor for subsequent broadcast. A timing mechanism 232, such as an oscillator, is in communication with the encryption module, the base band processor and the RF module and provides timing requirements for these components of the architecture.

The encryption module 200 will comprise a security engine 240 that implements multiple security algorithms. The security algorithms serve as the model of the rules by which a task, such as encryption or decryption, is carried out. In the illustrated embodiment the security engine includes a first security algorithm 250, a second security algorithm 260 and an nth security algorithm 270, which may or may not signify further security algorithms within the security engine. The security algorithms may include any known or future security algorithm, such as WEP, Dynamic WEP, nESA, TKIP, 3DES, AES or the like. By implementing multiple encryption algorithms the system of the present invention provides for heightened data security.

The security engine 240 is in communication with a memory module 280 that typically stores one or more security keys, one or more security modes and the setting registers that are used to assign the operation modes. A user interface 282, such as a keyboard or the like is in communication with the memory module of the encryption module and provides for a user to make inputs, such as security key inputs into the memory module.

The encryption module also includes first and second exclusive-OR (XOR) gates 290 and 300. The first XOR gate 290 is implemented in conjunction with the encryption process and performs a bitwise XOR operation on the transmitting key sequence outputted by the encryption portion of security algorithm and the data sequence that is being transmitted. The second XOR gate 300 is implemented in conjunction with the decryption process and performs a bitwise XOR operation on the receiving key sequence output by the decryption portion of the security algorithm and the data sequence that is being received.

In transmission operation, the encryption module 200 receives data sequences that are transmitted from the MAC processor 210. The security engine 240 processes the data sequence in accordance with the encryption portions of the security algorithms 250, 260, 270 with additional input from the memory module 280 to result in a transmission key sequence. The transmission key sequence and the transmission data sequence are inputted into the first XOR gate 290. The bitwise XOR operation results in an encrypted data sequence that is communicated to the base band processor 220 in the physical layer of the network. The encrypted data sequence is subsequently transmitted wirelessly via RF module 230.

In the instance in which the network is receiving data, an encrypted data sequence is sent from the broad band processor 220 in the physical layer to the encryption module 200 residing in the data link layer. The encrypted data sequence is inputted into the security engine 240 along with requisite data, such as security keys, register settings and the like stored in the memory module 280. The decryption portion of the security algorithms 250, 260, 270 decrypt the encrypted data sequence in accordance with a decrypted algorithm and output a received key sequence. The received key sequence and the received encrypted data sequence are inputted into the second XOR gate 300. The bitwise XOR operation results in a decrypted data sequence that is communicated to the MAC processor 210 in the MAC sub-layer of the network.

MAC Frame Header Encryption

Currently in IEEE 802.11 WLAN communication and other forms of wireless communication the Media Access Control (MAC) frame header, critical network information is broadcasted though the air interface to the surrounding environment. Therefore, critical information such as the MAC address, frame type, etc. can be detected by people with in-depth knowledge of the system. In one embodiment of the invention, the MAC frame header portion of the wireless frame undergoes encryption. Such encryption of the MAC frame header is referred to herein as an "enhanced hidden" operational mode. The main objective of the encryption of the MAC header portion is to provide the wireless network Access Point (AP) invisibility to unauthorized users and hostile hackers so that they are not aware of the existence of network.

FIG. 11 provides a block diagram of a wireless communication frame 300, in accordance with the prior art. The MAC header portion 310 includes a frame control portion 320, a duration/identification portion 330, first, second, third and fourth address portions 340-370, and a sequence control portion 380. The frame 300 will also include a data or frame body portion 400 and checksum portion 410. The address portions of the Mac header will include a source address, a destination address and access point addresses. FIG. 12 provides a block diagram of the format of the frame control portion 320 of the MAC header 310. Among other sub-portions of the frame control portion, this portion will include the frame type sub-portion 420 and the frame subtype sub-portion 430. If the type of MAC frame is exposed, then a potential attacker who is equipped with advanced tools can learn the existence of an AP, since certain frame types can only be transmitted from an AP.

In the present invention, the MAC header may be encrypted with a single encryption system or with multiple encryption systems. When multiple encryption systems are implemented, different portions of the MAC header may be assigned different encryption systems. As such, certain portions of the MAC header may undergo a single encryption method while other portions of the MAC header undergo multiple encryption methods. FIG. 13 illustrates a block diagram of a wireless communication frame 500, in which different portions of the MAC header undergo different encryption methods, in accordance with an embodiment of the present invention. The frame includes a MAC header portion 510, a data/information field portion 520 and a checksum portion 530. As illustrated the MAC header portion includes a frame control portion 540, a duration portion 550, and a 'rest of MAC header" portion 560 that includes addresses, sequence control and the like. According to one embodiment of the invention, the entire MAC header portion 510 undergoes a first encryption method and the "rest of MAC header" portion 520 undergoes a second encryption method. The encryption methods that are implemented on the MAC header portion may be performed in conjunction with the encryption of the frame body portion and CRC portion or the encryption methods that are implemented on the MAC header portion may be independent of the encryption methods used to encrypt the frame body and CRC portions.

Thus, the present invention provides for various operational modes for providing security to a wireless communication network, such as 802.11 WLAN communication, 802.16 Wireless MAN or WiMAX by providing various encryption options at the data link layer of the network. By providing various operational modes for encryption overall security of the 802.11 WLAN, 802.16 Wireless MAN or WiMAX communication is realized. In particular, the various operational modes provide invisibility to the network access points (APs) to unauthorized adapters and provide the ability to implement multiple cryptosystems to insure a heightened level of security. By having various operational modes, a system designer may select the most appropriate mode for the target application. The encryption or security algorithms that are implemented in the invention may be any current or future encryption or security algorithm that provides security to wireless network communication and, in particular 802.11 WLAN, 802.16 Wireless MAN or WiMAX communication.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A security system for implementation in a wireless communication network, the system comprising,
   an encryption module that is disposed in a data link layer of the wireless communications network, the encryption module including,
      a security engine that implements one or more security algorithms to perform encryption key sequence processing on data sequences of wireless network management frames, wherein the wireless communication network's access point is hidden from unauthorized adapters in response to the security engine performing the encryption key sequence processing; and
      a memory module in communication with the security engine that provides the one or more security algorithms with stored encryption data.

2. The security system of claim 1, wherein the wireless communication network is further defined as chosen from the group consisting of 802.11 Wireless Local Area Network (WLAN), 802.16 Wireless Metropolitan Area network (MAN) and Worldwide Interoperability for Microwave Access (WiMAX).

3. The security system of claim 1, wherein the encryption module is implemented on a programmable semiconductor device.

4. The security system of claim 1, wherein the encryption module further includes a first eXclusive OR (XOR) that performs bitwise XOR on an encryption key sequence and the data sequences of the wireless network management frames resulting in encrypted and XORed transmission of the data sequences of the wireless network management frames.

5. The security system of claim 4, wherein the encryption module further comprises a second eXclusive (XOR) that performs bitwise XOR on a decryption key sequence and the data sequences of the wireless network management frames resulting in the decryption of the data sequences that are received.

6. A method for providing security to a wireless communication network, the method comprising:
   hiding from unauthorized adapters an access point of the wireless communication network;
   generating a wireless network management frame including a frame body portion;
   encrypting the frame body portion of the wireless network management frame;

communicating, wirelessly, the encrypted wireless network management frame; and decrypting the frame body portion of the wireless network management frame.

7. The method of claim 6, further comprising performing an eXclusive OR operation on the frame body portion of the wireless network management frame, wherein the eXclusive OR operation is performed after the frame body portion is encrypted and before the frame body portion is decrypted.

8. The method of claim 6, further comprising performing an eXclusive OR operation on the frame body portion of the wireless network management frame, wherein the eXclusive OR operation is performed after the frame body portion is decrypted.

9. The method of claim 6, wherein the encrypting the frame body portion of the wireless network management frame further comprises encrypting the frame body portion of the wireless network management frame with a plurality of different crypto system algorithms.

10. The method of claim 9, wherein the encrypting the frame body portion of the wireless network management frame with the plurality of different cryptosystem algorithms further defines the cryptosystem algorithms as chosen from the group consisting of nESA (nDosa Enhanced Security Algorithm), Wired Equivalent Privacy (WEP), Dynamic WEP, Temporal Key Integrity Protocol (TKIP) of Wi-Fi Protected Access (WPA), 3DES (Triple Data Encryption Standard) and AES (Advanced Encryption Standard).

11. The method of claim 6, wherein hiding the access point further comprises encrypting a Media Access Control (MAC) header portion of the wireless network management frame.

12. The method of claim 6, further comprising:
generating a wireless network data frame including a body portion;
encrypting the body portion of the wireless network data frame;
communicating, wirelessly, the encrypted wireless network data frame; and
decrypting the body portion of the wireless network data frame.

13. The method of claim 12, wherein the encrypting the body portion of the wireless network data frame and the encrypting the frame body portion of the wireless network management frame are further defined as being encrypted by a single cryptosystem algorithm.

14. The method of claim 12, wherein the encrypting the body portion of the wireless network data frame and the encrypting the frame body portion of the wireless network management frame are further defined as being encrypted by different crypto system algorithms.

15. The method of claim 12, further comprising the performing an eXclusive OR operation on the body portion of the wireless network data frame, wherein the eXclusive OR operation is performed after the body portion is encrypted and before the body portion is decrypted.

16. The method of claim 15, further comprising the performing an eXclusive OR operation on the body portion of the wireless network data frame, wherein the eXclusive OR operation is performed after the body portion is decrypted.

17. The method of claim 12, wherein the encrypting the body portion of the wireless network data frame further comprises encrypting the body portion of the wireless network data frame with a plurality of different cryptosystem algorithms.

18. A security system for implementation in a wireless communication network, the system comprising, an encryption module that is disposed in a data link layer of the wireless communications network, the encryption module including,
a security engine that implements one or more security algorithms to perform encryption key sequence processing on Media Access Control (MAC) header sequences of wireless network frames; and
a memory module in communication with the security engine that provides the one or more security algorithms with stored encryption data.

19. The security system of claim 18, wherein the wireless communication network is further defined as chosen from the group of wireless communications consisting of 802.11 Wireless Local Area Network (WLAN), 802.16 Wireless Metropolitan Area network (MAN) and Worldwide Interoperability for Microwave Access (WiMAX).

20. The security system of claim 18, wherein the encryption module is implemented on a programmable semiconductor device.

21. The security system of claim 18, wherein the encryption module further includes a first eXclusive OR (XOR) that performs bitwise XOR on an encryption key sequences and the MAC header sequences of the wireless network frames resulting in encrypted and XORed transmission of the MAC header sequences of the wireless network frames.

22. The security system of claim 21, wherein the encryption module further comprises a second eXclusive that performs bitwise XOR on a decryption key sequence and the MAC header sequences of the wireless network frames resulting in the decryption of the MAC header sequences that are received.

23. security system of claim 18, wherein the wireless network frames are further defined as wireless network data frames.

24. The security system of claim 18, wherein the wireless network frames are further defined as wireless network management frames.

25. The security system of claim 18, wherein the wireless network frames are further defined as wireless network management frames and wireless network data frames.

26. A method for providing security to a wireless communication network, the method comprising:
generating a wireless network frame including a Media Access Control (MAC) header portion;
encrypting the MAC header portion of the wireless network frame;
communicating, wirelessly, the MAC header portion as encrypted; and
decrypting the MAC header portion of the wireless network frame.

27. The method of claim 26, further comprising performing an eXclusive OR operation on the MAC header portion of the wireless network frame, wherein the eXclusive OR operation is performed after the MAC header portion is encrypted and before the MAC header portion is decrypted.

28. The method of claim 26, further comprising performing an eXclusive OR operation on the MAC header portion of the wireless network frame, wherein the eXclusive OR operation is performed after the frame body portion is decrypted.

29. The method of claim 26, wherein the encrypting the MAC header portion of the wireless network frame further comprises encrypting the MAC header portion of the wireless network frame with a plurality of different cryptosystem algorithms.

30. The method of claim 29, wherein the encrypting the MAC header portion of the wireless network frame with the plurality of different cryptosystem algorithms further defines the cryptosystem algorithms as chosen from the group consisting of nESA (n Encryption Security Algorithm), Wired Equivalent Privacy (WEP), Dynamic WEP, Temporal Key Integrity Protocol (TKIP) of Wi-Fi Protected Access (WPA), 3DES (third generation Data Encryption Standard) and AES (Advanced Encryption Standard).

31. The method of claim 26, wherein the generating the wireless network frame including the MAC header portion further comprises the wireless network frame being chosen from the group consisting of a data frame, a management frame, and combination thereof.

32. The method of claim 26, further comprising encrypting a body portion of the wireless network frame and decrypting the body portion of the wireless network frame.

33. The method of claim 32, wherein the encrypting the body portion of the wireless network frame and the encrypting the MAC header portion of the wireless network frame are further defined as being encrypted by a single cryptosystem algorithm.

34. The method of claim 32, wherein the encrypting the body portion of the wireless network frame and the encrypting the MAC header portion of the wireless network frame are further defined as being encrypted by different cryptosystem algorithms.

35. The method of claim 32, further comprising performing an eXclusive OR operation on the body portion of the wireless network frame, wherein the eXclusive OR operation is performed after the body portion is encrypted and before the body portion is decrypted.

36. The method of claim 32, wherein the encrypting the body portion of the wireless network frame further comprises encrypting the body portion of the wireless network frame with a plurality of different cryptosystem algorithms.

37. An encryption system for implementation in a wireless communication network, the system comprising,
an encryption module that is disposed in a data link layer of the wireless communication network, the encryption module including,
a security engine that implements one or more encryption algorithms to perform encryption key sequence processing on transmission data sequences of wireless network frames and a Media Access Control (MAC) header portion of the wireless network management frames;
a memory module in communication with the security engine that provides the one or more encryption algorithms with stored encryption data; and
a first eXclusive OR (XOR) that performs bitwise XOR on the encryption key sequence and the transmission data sequences resulting in encrypted XORed transmission data sequences of the wireless network frames.

38. The security system of claim 37, wherein the wireless communication network is further defined as chosen from the group of wireless communications consisting of 802.11 Wireless Local Area Network (WLAN), 802.16 Wireless Metropolitan Area network (MAN) and Worldwide Interoperability for Microwave Access (WiMAX).

39. The security system of claim 37, wherein the encryption module is implemented on a programmable semiconductor device.

40. The security system of claim 37, wherein the encryption module further comprises a second eXclusive that performs bitwise XOR on a decryption key sequence, the transmission data sequences of the wireless network frames, and the MAC header portion resulting in the data sequences of the wireless network frames and the MAC header portion being decrypted.

41. A method for providing security to a wireless communication network, the method comprising:
generating a wireless network frame;
encrypting at least a portion of the wireless network frame, wherein the at least a portion of the wireless network frame includes a Media Access Control (MAC) Header portion of the wireless network frame;
performing a bitwise eXclusive OR operation on an encryption key sequence, the at least a portion of the wireless network frame, and the MAC Header portion;
communicating, wirelessly, the at least a portion of the wireless network frame;
performing the bitwise eXclusive OR operation on a decryption key sequence and the at least a portion of the wireless network frame; and
decrypting the at least a portion of the wireless network frame.

42. The method of claim 41, wherein the encrypting at least a portion of wireless network frame further comprises encrypting at least a portion of the wireless network frame with a plurality of different cryptosystem algorithms.

43. The method of claim 42, wherein the encrypting at least a portion of wireless network frame with the plurality of different cryptosystem algorithms further defines the cryptosystem algorithms as chosen from the group consisting of nESA (n Encryption Security Algorithm), Wired Equivalent Privacy (WEP), Dynamic WEP, Temporal Key Integrity Protocol (TKIP) of Wi-Fi Protected Access (WPA), 3DES (third generation Data Encryption Standard) and AES (Advanced Encryption Standard).

44. The method of claim 41, wherein the performing the bitwise eXclusive OR (XOR) operation on the encryption key sequence and the at least a portion of the wireless network frame further defines the at least a portion of the wireless network frame as including a frame body portion.

45. The method of claim 41 wherein the performing the bitwise eXclusive OR operation on the encryption key sequence and the at least a portion of the wireless network frame further comprises choosing a random XOR pattern from the group consisting of a personal ID, a password, a work group ID, personal biographical data, and a random sequence.

* * * * *